United States Patent
Kyle

(10) Patent No.: US 7,712,820 B1
(45) Date of Patent: May 11, 2010

(54) EASY OPEN COLLAPSIBLE TRAILER

(76) Inventor: Gordon Kyle, 9 Indian Hill Rd., Norwich, CT (US) 06360

( * ) Notice: Subject to any disclaimer, the term of this patent is extended or adjusted under 35 U.S.C. 154(b) by 245 days.

(21) Appl. No.: 12/074,135

(22) Filed: Feb. 29, 2008

(51) Int. Cl.
*B60P 3/355* (2006.01)
(52) U.S. Cl. ............... 296/173; 296/159; 296/162; 296/26.02
(58) Field of Classification Search .......... 296/159, 296/162, 173, 168, 26.06, 26.02, 181.7; 52/63, 52/66, 69; 135/88.1, 148–150
See application file for complete search history.

(56) References Cited

U.S. PATENT DOCUMENTS

| | | | |
|---|---|---|---|
| 2,188,545 A | | 1/1940 | Smelker |
| D149,702 S | | 5/1948 | Smith |
| 2,567,516 A | * | 9/1951 | Jones .................... 296/173 |
| 2,569,082 A | | 9/1951 | Wheeler |
| 2,686,075 A | | 8/1954 | Steiner |
| D181,915 S | | 1/1958 | Spencer |
| 2,853,338 A | | 9/1958 | Stanley |
| 2,920,919 A | | 1/1960 | Spencer |
| 2,995,398 A | | 8/1961 | Davenport |
| 3,284,128 A | * | 11/1966 | Alarie .................... 296/173 |
| D210,717 S | | 4/1968 | Johnson |
| 3,429,609 A | | 2/1969 | Robb |
| 3,445,134 A | | 5/1969 | Pair et al. |
| 3,591,230 A | | 7/1971 | Cramer |
| 3,632,153 A | * | 1/1972 | Knudsen .................... 296/169 |
| 3,700,124 A | | 10/1972 | Lawrence |
| 3,823,975 A | | 7/1974 | Cooper |
| 3,830,541 A | | 8/1974 | Bowman et al. |
| 3,875,953 A | | 4/1975 | Couix |
| 4,057,283 A | * | 11/1977 | Barnett .................... 296/173 |
| 4,149,748 A | | 4/1979 | Tanner |
| 5,375,902 A | * | 12/1994 | Church .................... 296/169 |
| 5,414,966 A | * | 5/1995 | Montoya .................... 52/66 |
| 6,840,569 B1 | | 1/2005 | Leigh |
| 2006/0273622 A1 | * | 12/2006 | Laird .................... 296/168 |

* cited by examiner

*Primary Examiner*—Jason S Morrow
(74) *Attorney, Agent, or Firm*—Simpson & Simpson, PLLC

(57) ABSTRACT

A collapsible trailer including a base, a shell hingedly secured to said base, wherein said shell engages with said base to form a sealed vessel when said trailer is in a closed position, a rear wall hingedly secured to said base, wherein said rear wall is entirely contained within said shell and said base when said trailer is in said closed position, a rear deck hingedly secured to said base, wherein said deck is entirely contained within said shell and said base when said trailer is in said closed position, a coupling means secured between said rear wall and said rear deck for transferring forces between said rear deck and said rear wall, and wherein said rear wall, said shell, and said base generally define a first room when said trailer is in said open position.

14 Claims, 9 Drawing Sheets

EASY OPEN COLLAPSIBLE TRAILER

FIELD OF THE INVENTION

The present invention generally relates to trailers, and even more specifically to trailers which are collapsible and easy to open.

BACKGROUND OF THE INVENTION

Collapsible trailers are known in the art. Such trailers are desired because they can be compactly closed for storage or transport, and opened to increase the volume of the trailer. However, most collapsible trailers, even smaller models, are not easy to open or to keep open. Clearly, trailers suited to be a living space, such as for camping or the like, must be larger and heavier, and are therefore even more difficult to open, keep open, and to close. Thus, it becomes increasingly essential for large trailers to be designed to be easy to open, keep open, and close. Traditional collapsible trailers take several minutes to open, may require more than one person or complex mechanical components to open, and require latches, locks, or other securing mechanisms in order to keep the trailers open. Mainly for these reasons, collapsible trailers known in the art each comprise only a single room, as it becomes increasingly difficult to create a trailer large enough to include two rooms, which is still able to be opened and collapsed by users.

Thus, there is a need for a collapsible trailer that can be used as a living space while camping, for example, which is quick and easy to open, and includes a plurality of separate rooms.

BRIEF SUMMARY OF THE INVENTION

The present invention broadly comprises a collapsible trailer including a base, a shell hingedly secured to said base, wherein said shell engages with said base to form a sealed vessel when said trailer is in a closed position, a rear wall hingedly secured to said base, wherein said rear wall is entirely contained within said shell and said base when said trailer is in said closed position, a rear deck hingedly secured to said base, wherein said deck is entirely contained within said shell and said base when said trailer is in said closed position, a coupling means secured between said rear wall and said rear deck for transferring forces between said rear deck and said rear wall, and wherein said rear wall, said shell, and said base generally define a first room when said trailer is in said open position.

In a further embodiment the collapsible trailer includes a pair of oppositely disposed interior walls immovably secured to the base, wherein the pair of interior walls is entirely contained within the shell and the base when the trailer is in the closed position, a pair of wing walls rigidly secured to the rear wall, wherein each of the wing walls is housed in a slot located between the base and the interior walls when the trailer is in the closed position, a support frame hingedly secured to the base, wherein the support frame is entirely contained within the shell and the base when the trailer is in the closed position, wherein said coupling means comprises a first set of cables and a second set of cables, wherein the first set of cables connects the deck to the support frame for transferring forces between the deck and the support frame, the second set of cables connects the support frame to the rear wall for transferring forces between the support frame and the rear wall, wherein the rear wall, the shell, the interior walls, the wing walls, and the base generally define a first room when the trailer is in the open position, and wherein the rear wall, the deck, the first and second set of cables, and the support frame generally define a patio area.

In yet a further embodiment the present invention includes a screen secured over the rear deck, wherein the rear deck, the screen, the cables, the support frame, and the rear wall generally define a second room enclosing the patio area.

It is a general object of the present invention to provide a collapsible trailer which can expand to a volume large enough to be used as a comfortable living space.

It is another object of the present invention to provide a trailer with the above object that can be easily and quickly opened by a single person.

It is yet a further object of the present invention to provide a trailer with the above objects that includes two rooms.

It is yet another object of the present invention to provide a trailer with the above objects that utilizes a counterbalancing system to maintain an open position for the trailer without the need for locks or latches.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it should be understood that this invention is not limited to the particular methodology, materials and modifications described and as such may, of course, vary. It should also be understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
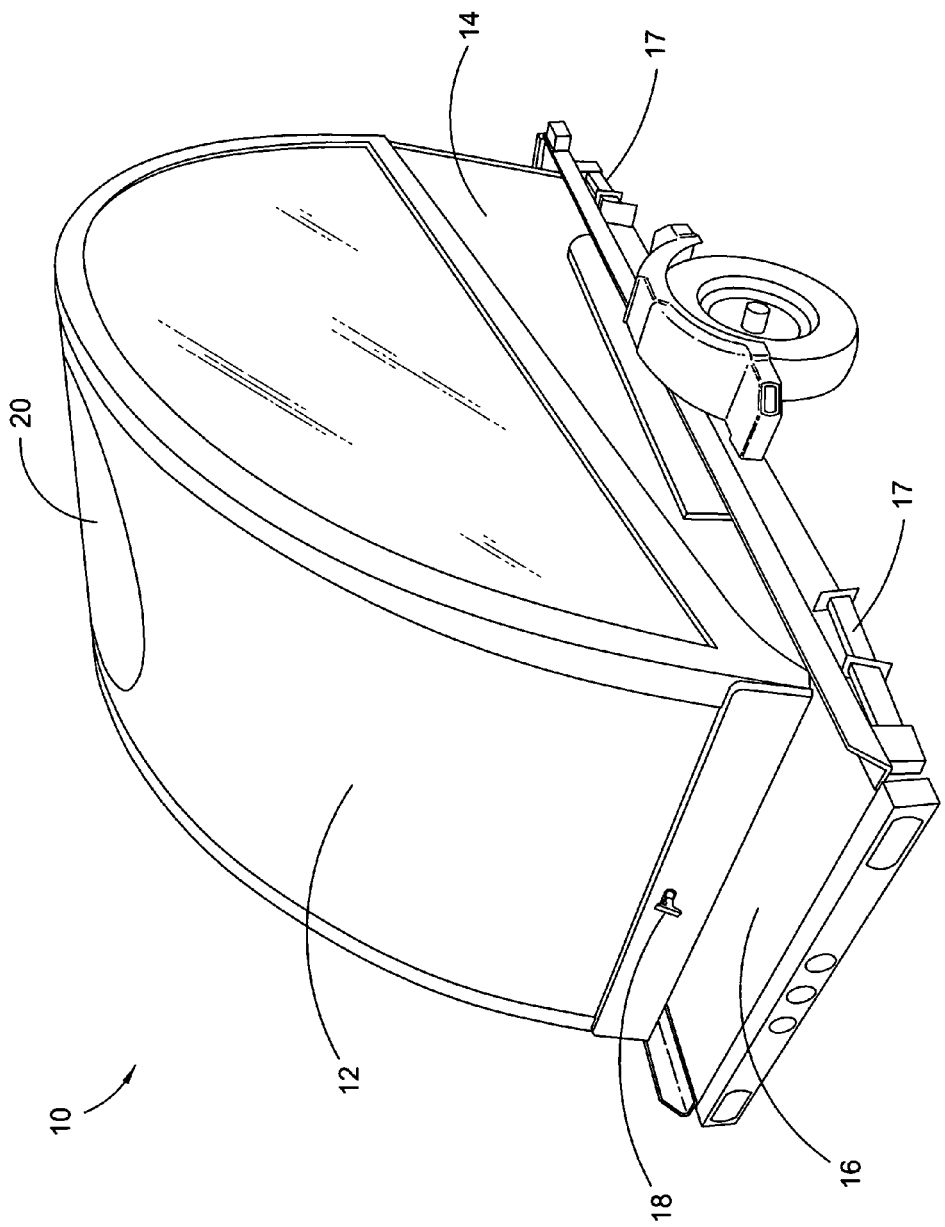
FIG. 1 is a perspective view of the present invention trailer in a closed position.

Referring now to the drawings, FIG. 1 is a perspective view of present invention collapsible trailer 10. Trailer 10 in FIG. 1 is in a closed position. In this position shell 12 is engaged with base 14 to create a sealed vessel. The shell is selectively secured to the base by latch means 18. Shell 12 is also shown including skylight 20, for allowing light into the trailer. It can be seen that the sides of base 14 are angled downwards towards the front of the trailer so that the shell engages the base so that the closed trailer substantially resembles a teardrop in shape. The closed position shown in FIG. 1 is primarily used during storage or transportation of trailer 10. In the preferred embodiment shown, trailer 10 is transported using single axle flatbed 16. Flatbed 16 can be any other transportation means known in the art, but flatbed 16 is preferred since essentially any automobile can be outfitted to tow such a flatbed. Once trailer 10 has been transported to its destination, it can be removed from the flatbed, so that the flatbed can be utilized for other purposes. If the trailer is used when still on top of the flatbed, support legs 17 can be deployed to help keep the trailer steady. It should be appreciated that a flatbed or other transportation means is only required when transporting the trailer, and that the trailer can be used just as effectively if it is removed from the flatbed.

Figure 2:
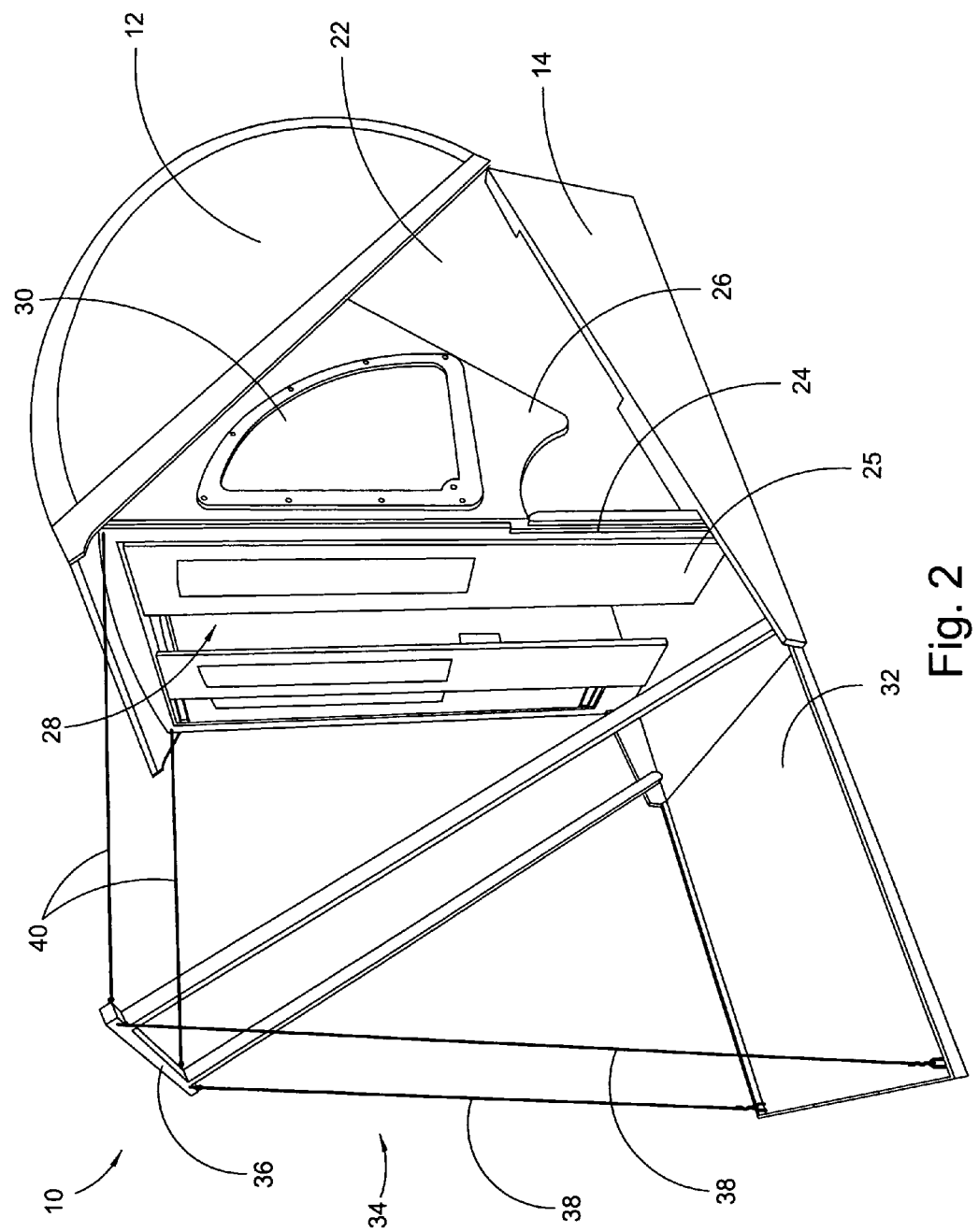
FIG. 2 is a perspective view of the present invention trailer in an open position.
Figure 3:
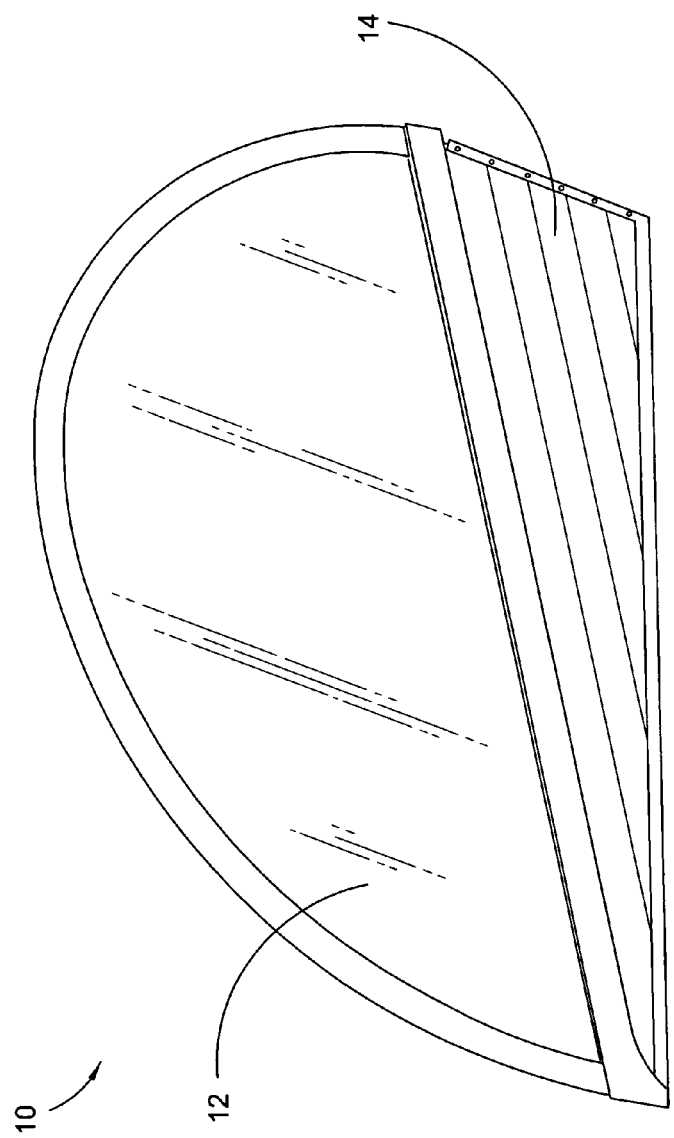
FIG. 3 is a side view of the present invention trailer in a closed position.

Trailer 10 is shown fully opened in FIG. 2. It can be seen that shell 12 has been lifted off of base 14 revealing many components which were housed inside of the trailer when it was in a closed position. Interior walls 22 are rigidly secured to base 14, and located just inside of the base. Even though interior walls 22 are stationary, they are operatively sized to fit inside the trailer when shell 12 is closed. Rear wall 24 is shown in a substantially vertical position, and the top of the rear wall is shown engaged with shell 12. Rear wall 24 includes a door means 25. In a preferred embodiment, door 25 is a pair of horizontally sliding doors. A pair of wing walls 26 is rigidly secured to the rear wall. Therefore, it should be appreciated that the cavity formed by shell 12, base 14, interior walls 22, rear wall 24, and wing walls 26 generally defines room 28. Additionally, in a preferred embodiment, window 30 in wing wall 26 allows additional light into room 28.

In a preferred embodiment, room 28 includes a couch which folds out into a bed, a movable stovetop unit, a movable faucet unit with water tank, shelves, cabinets, or other optional amenities that may be desired when utilizing trailer 10, such as during a camping trip. Furthermore, room 28 may have access to additional water storage tanks, or power supplies such as large batteries or generators. Room 28 can be any dimensions, but is preferably about eight feet at its highest point, six feet wide, and eight feet long. These preferred dimensions enable plenty of headroom for a grown adult to stand, as well as for the fold out bed to comfortably accommodate two adults. In a preferred embodiment, the components which define room 28, namely shell 12, base 14, interior walls 22, rear wall 24, and wing walls 26 are primarily constructed from wood, so that room 28 is enclosed by a hard walled cabin.

Referring back to FIG. 2, it can be seen that rear deck 32 is in a substantially horizontal position, which generally defines patio area 34. Patio area 34 is further defined by support frame 36 which is coupled to rear deck 32 and rear wall 24 by cables 38 and 40, respectively. In a preferred embodiment, cables 38 and 40 are lengths of rope, but they could be any other coupling means known in the art capable of transferring the weight of the deck to the rear wall for holding the rear wall in the open position. It should be appreciated a single cable can run from deck 32 through support frame 36 and secure to rear wall 24. Therefore, cables 38 and 40 may be defined portions of the same cable. In such an embodiment, it may be necessary to tie knots in the cables, or provide some other means to specify the lengths of cables 38 and 40. For example, if the length of each cable 40 was not restricted or defined, support frame 36 would simply fall into a horizontal position on top of deck 32. It should also be appreciated that the support frame and cables aid in further defining patio area 34. Rear wall 24, deck 32, and frame 36 are all hingedly, or rotationally, secured to base 14. By hingedly, we mean that the components are connected by a hinge means, or by some other similar means of connection known in the art, generally creating a hinging or pivoting relation between the components.

Figure 4:
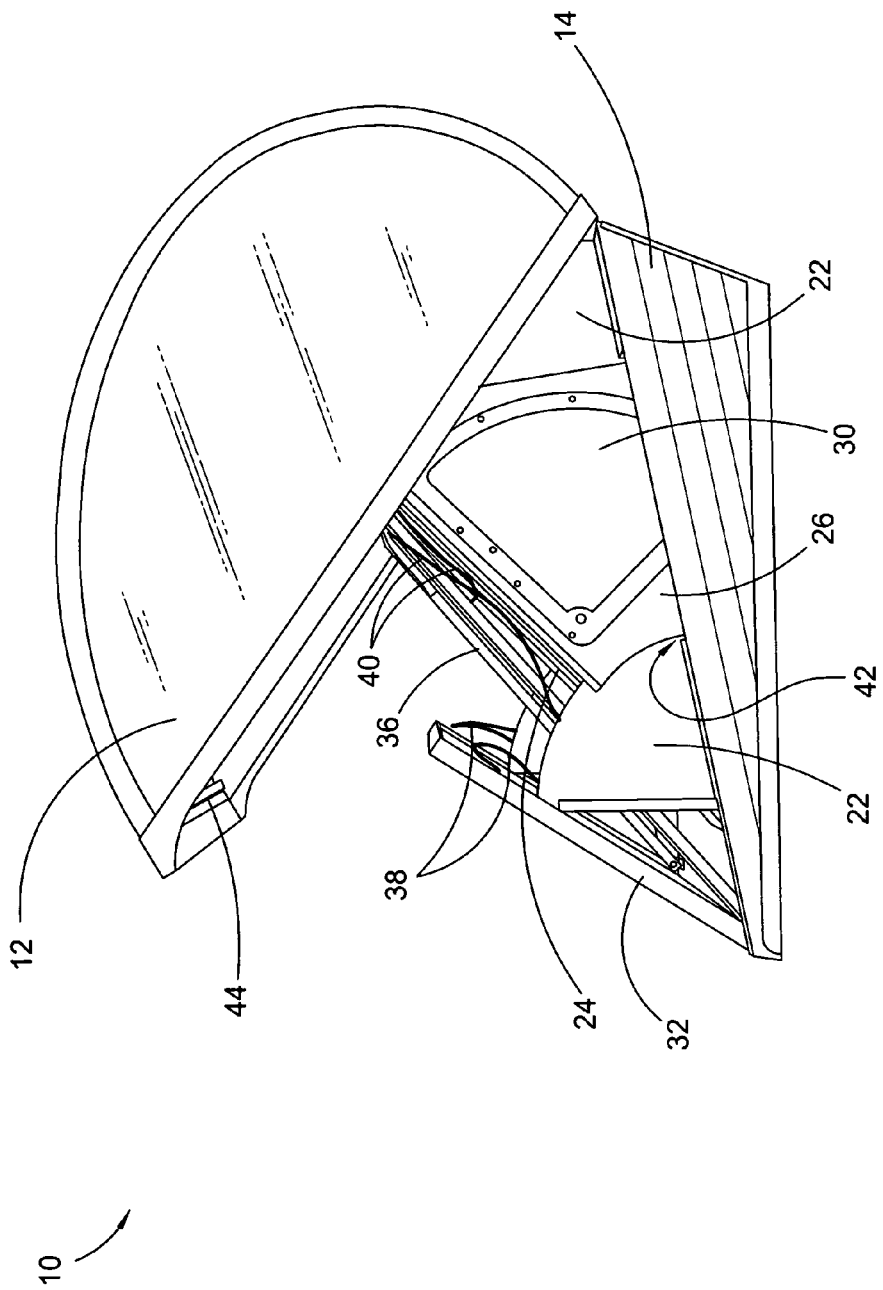
FIG. 4 is a side view of the present invention trailer with a shell of the trailer in an open position.

FIGS. 3-6 illustrate trailer 10 transitioning from a closed position to a fully opened position, as viewed from substantially the right side of trailer. It should be understood that the left side is substantially an identical to the right side. Clearly, trailer 10 is in a closed position in FIG. 3, with shell 12 engaged with base 14 to create a sealed vessel. FIG. 4 illustrates the trailer with shell 12 opened, but all other components in the closed position. Lip 44 can be seen attached to the under portion of shell 12. Lip 44 is included in a preferred embodiment to engage with rear wall 22, and ensure that the rear wall does not over rotate towards the deck as the trailer transitions into the open position. It can be seen that rear wall 24, deck 32, and frame 36 are all at angles leaning inside of the trailer. Cables 38 and 40 are flexible, so they are folded up loosely inside the trailer. It can be seen that wing walls 26 slide down into slots 42, which are located between base 14 and interior walls 22 on both sides of the trailer. This enables the sidewalls and rear wall sufficient room so that the shell can be tightly closed and latched onto the base.

Figure 5:
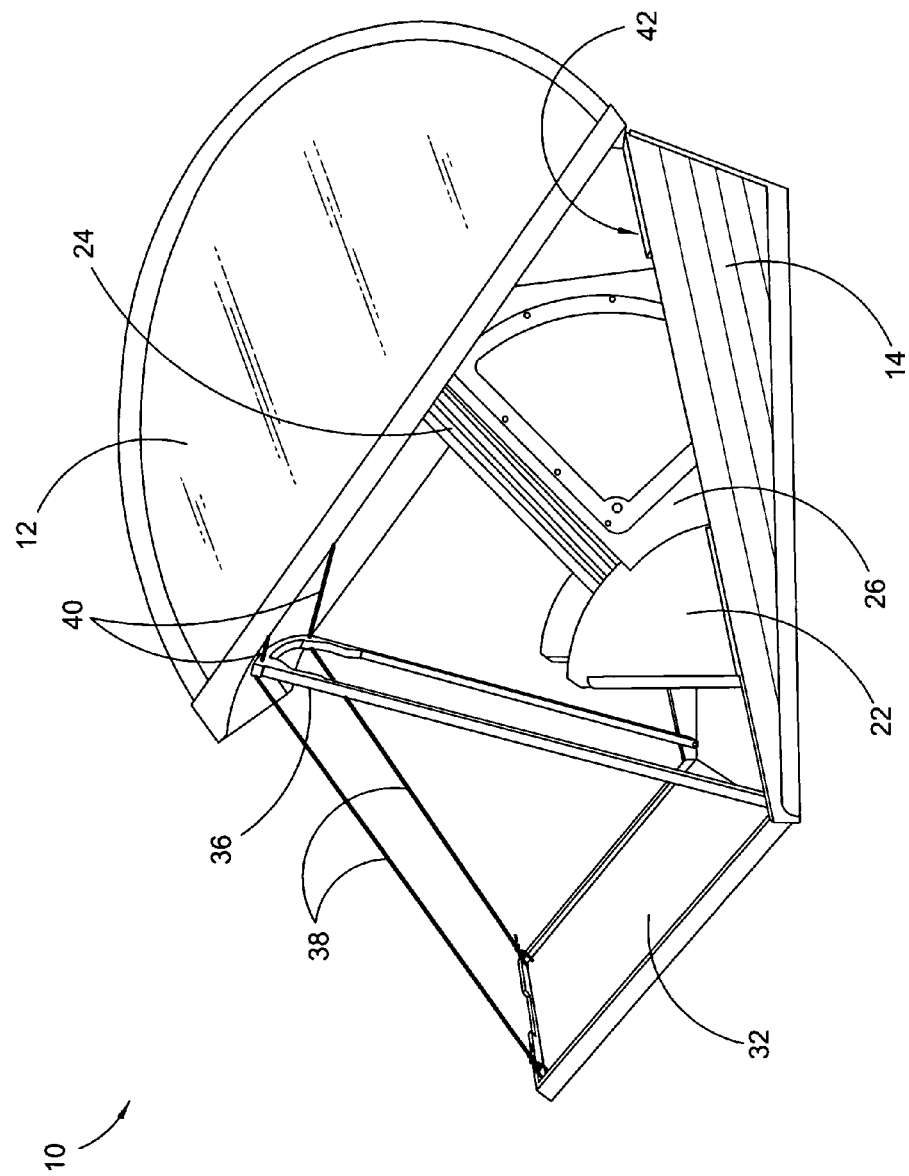
FIG. 5 is a side view of the present invention trailer with a rear deck, support frame, and rear wall halfway between an open and a closed position.

FIG. 5 illustrates the trailer in a half-open position. To open and expand the trailer, a user will rotate the rear deck into a substantially horizontal position. The bottom of the rear deck may include handles (not shown) to enable a user a better grip on the deck for aiding in the opening of the trailer. Once the rear deck is in the position shown in FIG. 5, it can be seen that cables 38 and 40 are taut. That is, there is tension in cables 38 and 40 created by the weight of the deck. This causes deck 32, via cable 38, to pull frame 36 out of its corresponding closed, resting position, which in turn causes frame 36, via cable 40, to pull rear wall 24 out of its corresponding closed, resting position. At the position shown in FIG. 5, the weight of the deck due to gravity assists in lifting the frame and the rear wall into their respective open positions. If the trailer is built to the preferred specifications the transition from completely closed to fully open, as illustrated in FIGS. 3-6, can be achieved in under a minute with relatively little effort by a single person.

Figure 6:
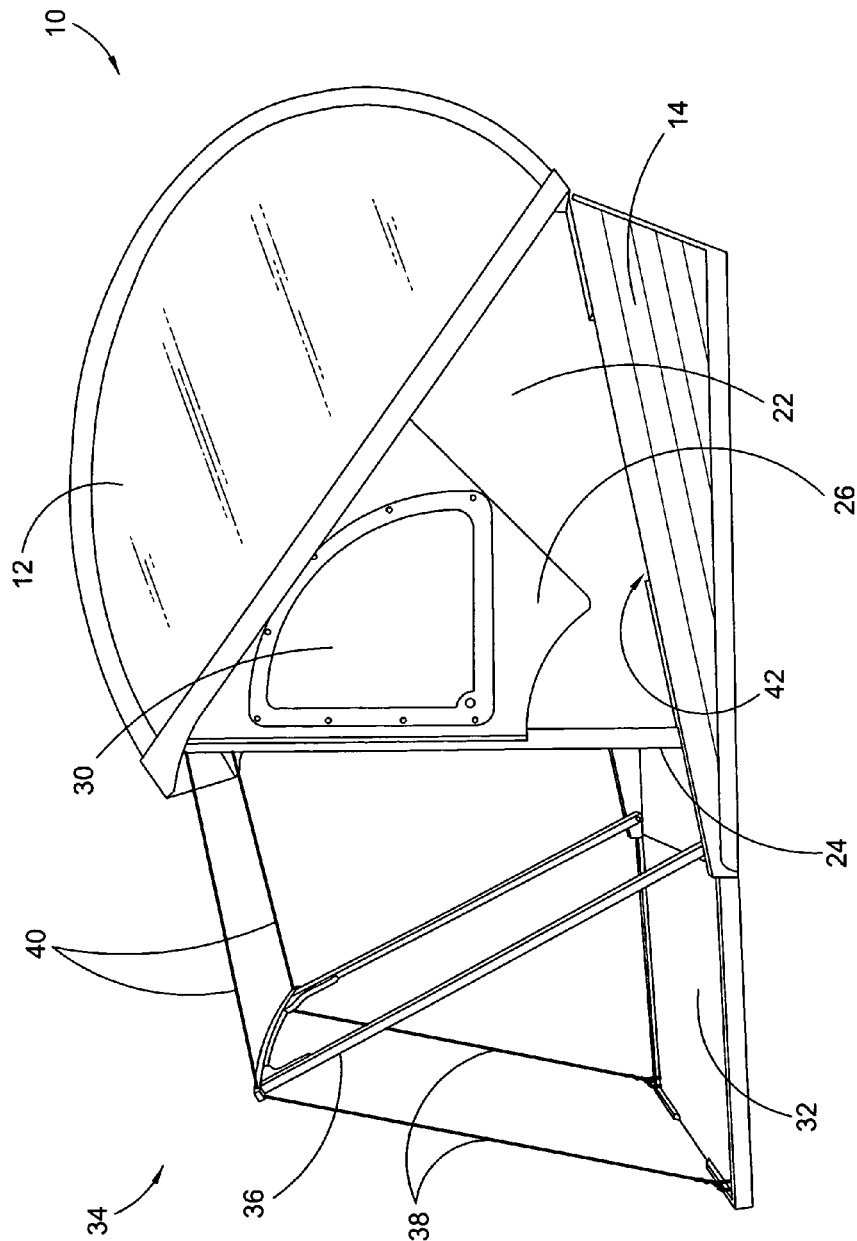
FIG. 6 is a side view of the present invention trailer in a fully opened position.

Trailer 10 is fully opened in FIG. 6. Advantageously, the weight of the rear deck firmly holds the rear wall in place. Furthermore, the rear wall and shell engage so that the rear wall partially supports the shell, and the shell helps to hold the rear wall in place. Therefore, if the rear wall were accidentally pushed or leaned on, the rear wall would not easily move, as the rear wall is held in place. Thus, the trailer does not require latches, locks, or other securing mechanisms to maintain the trailer in its fully opened position. However, the rear deck is relatively easy to lift from the bottom, and it does not take much effort to lift the rear deck, and subsequently push the frame and rear wall back down into the closed position. This is because once the rear deck is lifted, the tension on the cables is loosened, and the closing process of the trailer is assisted by the force of gravity.

Specifically, one can appreciate the counter-balancing effect of the front gate by calculating the relative sizes of the moments due to gravity for the rear wall, rear deck, and support frame. When the trailer is in static equilibrium, the only forces on the trailer will be caused by gravity. As is well known, a moment is calculated by multiplying the forces on the object by the moment arm. The moment arm is the perpendicular distance between the object's pivot point and the point where the force acts. Since the only forces are due to gravity, the forces will be equal to the object's weight, and act at the center of gravity. Since gravity acts in a vertical direction, the weight is multiplied by the distance between the object's center of gravity and the pivot point. Consequently, the maximum moment for any object due to gravity will occur when the center of gravity is at the furthest possible horizontal distance from the hinge point. For the rear deck, the maximum moment due to gravity occurs when the deck is in a completely horizontal position, such as when the trailer if fully opened. Likewise, the moment due to gravity will be essentially zero if the object is in a substantially vertical position. Therefore, in the fully open position shown in FIG. 6, the moment due to gravity is at a maximum for the rear deck, which is in a horizontal position, and at essentially zero for the rear wall, which is in a vertical position. Therefore, it can be further appreciated how the rear deck is capable of keeping the rear wall in the open position without the need for any complicated locks, latches, or other securing mechanisms. Lip 44 may be included to ensure that the rear wall does not over rotate, but the weight of deck is primarily responsible for keeping the trailer in the open position. Thus, the moment due to gravity on the rear deck is significantly larger than the corresponding moment on the rear wall. Consequentially, the weight of the deck, as transferred to the rear wall by the cables, holds the rear wall, and therefore the entire trailer, in the open position.

Figure 7:
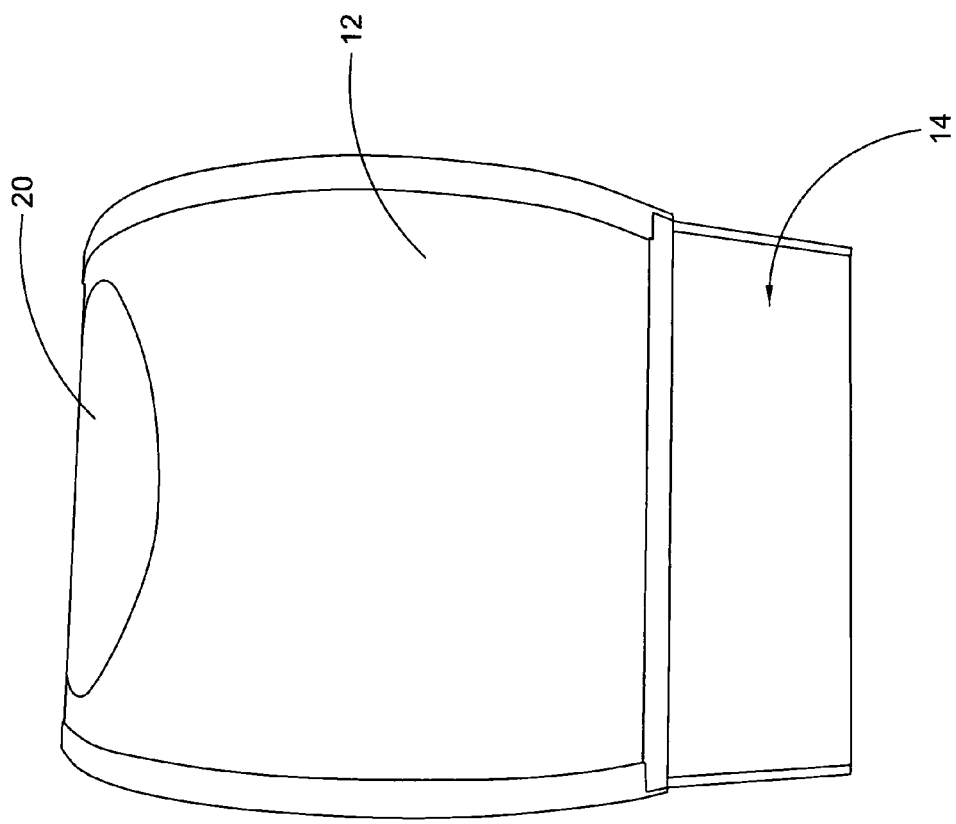
FIG. 7 is a rear view of the present invention trailer in an open position; and, FIG. 8 is a side view of the present invention trailer in a fully open position including hidden lines to show some concealed components; and, FIG. 9 is a perspective view of the present invention trailer including a screen for defining a second room.

The front of the trailer is shown in an open position is shown in FIG. 7. It can be seen that shell 12 is hingedly secured to the back of base 14. Once again skylight 20, a large oval shaped window, can be seen on the top of shell 12.

Figure 8:
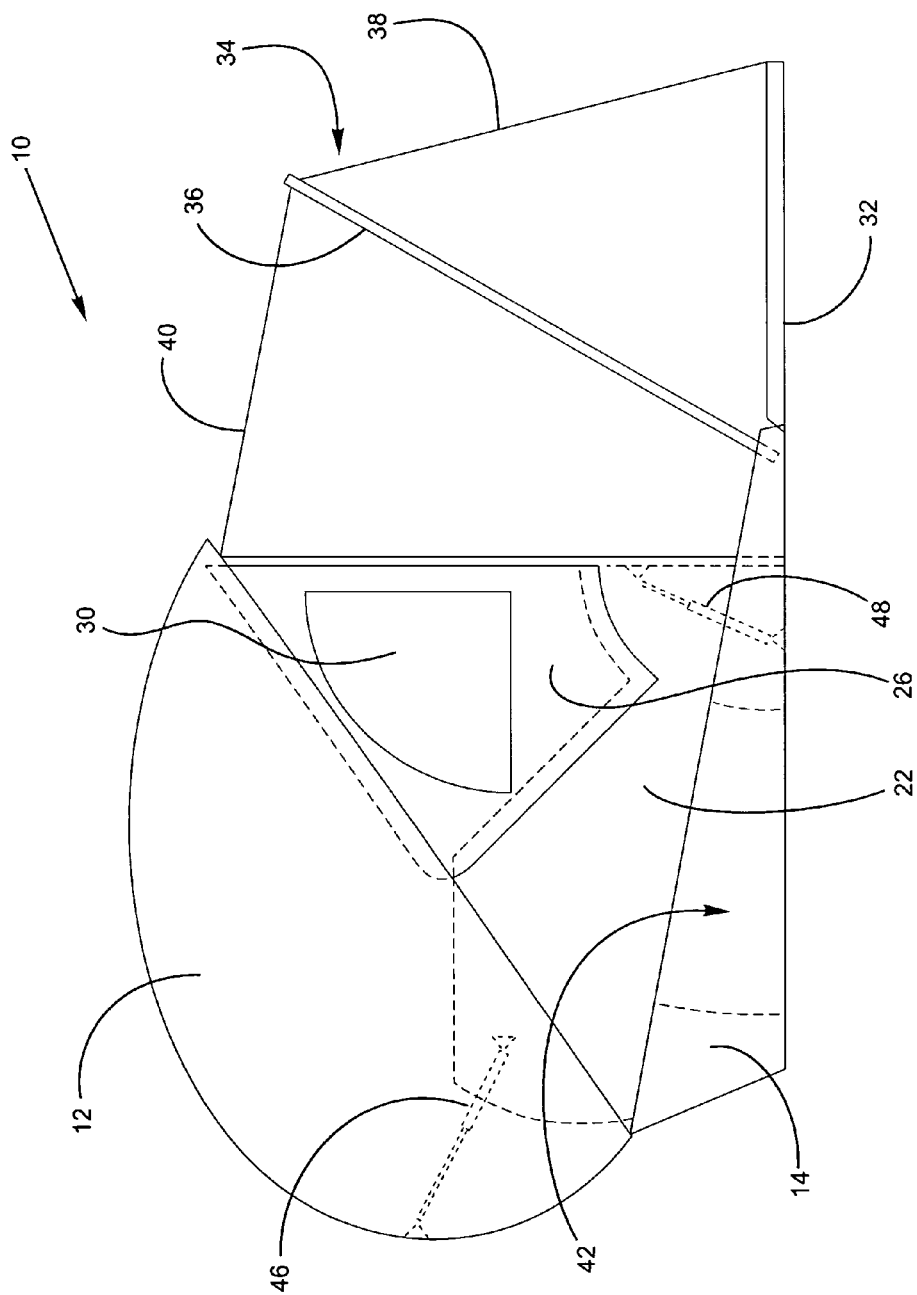

FIG. 8 is a side view of trailer 10. Hidden lines are utilized in this Figure to better illustrate the relative placement of the various components of the trailer. For example, the outline of gap 42, which is used to accommodate wing walls 26 when the trailer is in a closed position, is shown near base 14. Additionally, the profile of interior walls 22 is shown, and it can be seen in the shown preferred embodiment that wing walls 26 overlap the interior walls slightly. Pneumatic cylinders 46 and 48 are also indicated by hidden lines. In a preferred embodiment, cylinder 46 may be installed between shell 12 and interior wall 22 inside the trailer to assist in the opening of the shell, and to hold the shell open. Likewise, pneumatic cylinder 48 may be included secured between base 14 and rear wall 24 inside of the trailer to facilitate the opening of the trailer. In addition to assisting in lifting, the pneumatic cylinders are preferably included because they ensure that the opening and closing of the trailer occur at steady rates, which increases the safety of the operation of the trailer.

Figure 9:
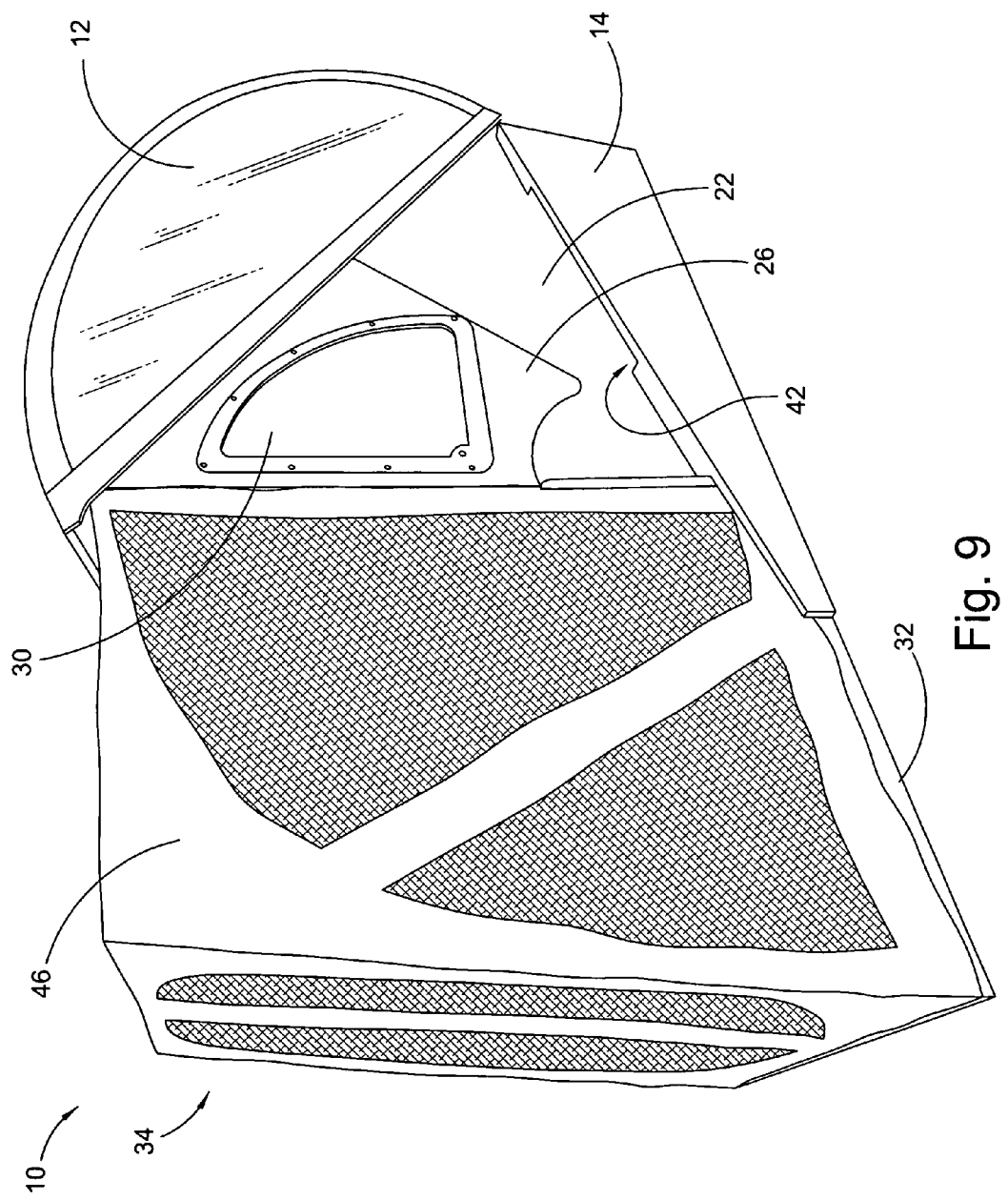

FIG. 9 shows a preferred embodiment of the current invention, in which patio 34 is covered by screen 46. The previous Figures did not include screen 46 so that the other components of trailer 10 could be more clearly illustrated. In a preferred embodiment, screen 46 is removably secured about deck 32, frame 36, rear wall 24, and cables 38 and 40 to generally define a second room around patio area 34. That is, the patio area essentially becomes a second room for the trailer, as defined by screen 46. In a preferred embodiment screen 46 is fabricated by a water proof material, similar to camping tents, so that the second room is protected from the elements. Of course, for cleaning or in the event of good weather, the screen can simply be removed. Some detachable securing means such as zippers, snaps, hook-and-loop fasteners, or the like is used to secure the screen to the deck and rear wall. Since the screen is made from a flexible material, it is not necessary to remove the screen before closing the trailer; the screen simply folds up inside the trailer as the trailer collapses into the closed position. In a preferred embodiment screen 46 includes closable door and window means, such as by zippers, similar to what would be included in typical camping tents or screens. The room defined within patio area 34 by screen 46 is preferably big enough for a large air mattress, so that the trailer can comfortably accommodate an additional two adults, for a total of four, if necessary.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A collapsible trailer comprising:
    a base;
    a shell hingedly secured directly to said base, wherein said shell engages with said base to form a sealed vessel when said trailer is in a closed position;
    a rear wall hingedly secured directly to said base, wherein said rear wall is entirely contained within said shell and said base when said trailer is in said closed position;
    a rear deck hingedly secured to said base, wherein said deck is entirely contained within said shell and said base when said trailer is in said closed position;
    a coupling means secured between said rear wall and said rear deck for transferring forces between said rear deck and said rear wall; and,
    wherein said rear wall, said shell, and said base generally define a first room when said trailer is in an open position.

2. The collapsible trailer recited in claim 1 wherein said rear deck is in a substantially horizontal position, generally defining a patio area, when said trailer is in said open position.

3. The collapsible trailer recited in claim 2 further comprising a screen secured about said patio area, wherein said screen and said deck generally define a second room for said trailer.

4. The collapsible trailer recited in claim 1 further including at least one pneumatic cylinder for facilitating a transition of said trailer from said closed position to said open position.

5. The trailer recited in claim 3 wherein said first and second rooms are connected by a door means in said rear wall.

6. The trailer recited in claim 1 wherein said shell and said base engage together to form a substantially tear-drop shape.

7. The trailer recited in claim 1 further including a flatbed trailer for transporting said collapsible trailer.

8. The trailer recited in claim 1 further comprising a support frame hingedly secured to said base, wherein said support frame is entirely contained within said shell and said base when said trailer is in said closed position, and wherein said coupling means comprises a first set of cables and a second set of cables, wherein said first set of cables is coupled between said deck and said support frame for transferring forces between said deck and said support frame, and said second set of cables is coupled between said support frame and said rear wall for transferring forces between said support frame and said rear wall.

9. The trailer recited in claim 1 further comprising a pair of wing walls rigidly secured to said rear wall, wherein each of said wing walls is housed in a slot located proximate to said base when said trailer is in said closed position.

10. The trailer recited in claim 1 further comprising a pair of oppositely disposed interior walls immovably secured to said base, wherein said pair of interior walls is entirely contained within said shell and said base when said trailer is in said closed position.

11. The collapsible trailer recited in claim 1 wherein a weight of said rear deck is transferred to said rear wall for holding said trailer in said open position.

12. A collapsible trailer comprising:
a base;
a shell hingedly secured to said base, wherein said shell engages with said base to form a sealed vessel when said trailer is in a closed position;
a pair of oppositely disposed interior walls immovably secured to said base, wherein said pair of interior walls is entirely contained within said shell and said base when said trailer is in said closed position;
a rear wall hingedly secured to said base, wherein said rear wall is entirely contained within said shell and said base when said trailer is in said closed position;
a pair of wing walls rigidly secured to said rear wall, wherein each of said wing walls is housed in a slot located between said base and said interior walls when said trailer is in said closed position;
a rear deck hingedly secured to said base, wherein said deck is entirely contained within said shell and said base when said trailer is in said closed position, and wherein said deck is in a substantially horizontal position when said trailer is in an open position;
a support frame hingedly secured to said base, wherein said support frame is entirely contained within said shell and said base when said trailer is in said closed position;
a first set of cables coupled between said deck and said support frame for transferring forces between said deck and said support frame;
a second set of cables coupled between said support frame and said rear wall for transferring forces between said support frame and said rear wall;
wherein said rear wall, said shell, said interior walls, said wing walls, and said base generally define a first room when said trailer is in said open position; and,
wherein said rear wall, said deck, said first and second set of cables, and said support frame generally define a patio area when said trailer is in said open position.

13. The trailer recited in claim 12 further comprising a screen secured about said deck, said frame, and said cables.

14. A collapsible trailer comprising:
a base;
a shell hingedly secured to said base along one edge of said base only, wherein said shell engages with said base to form a sealed vessel when said trailer is in a closed position;
a rear wall hingedly secured to said base, wherein said rear wall is entirely contained within said shell and said base when said trailer is in said closed position;
a rear deck hingedly secured to said base, wherein said deck is entirely contained within said shell and said base when said trailer is in said closed position;
a coupling means secured between said rear wall and said rear deck for transferring forces between said rear deck and said rear wall; and,
wherein said rear wall, said shell, and said base generally define a first room when said trailer is in an open position.

\* \* \* \* \*